United States Patent
Di Fiore et al.

(10) Patent No.: US 9,105,887 B2
(45) Date of Patent: Aug. 11, 2015

(54) ANODE INJECTOR CONTROL ALGORITHM FOR A LOW FREQUENCY DISCRETE OUTPUT

(75) Inventors: Daniel C. Di Fiore, Scottsburg, NY (US); Matthew A. Lang, Churchville, NY (US)

(73) Assignee: GM Global Technology Operations LLC, Detroit, MI (US)

(*) Notice: Subject to any disclaimer, the term of this patent is extended or adjusted under 35 U.S.C. 154(b) by 754 days.

(21) Appl. No.: 13/315,186

(22) Filed: Dec. 8, 2011

(65) Prior Publication Data

US 2013/0149622 A1    Jun. 13, 2013

(51) Int. Cl.
*H01M 8/04* (2006.01)
*G05B 13/02* (2006.01)
*H01M 8/00* (2006.01)

(52) U.S. Cl.
CPC ........ *H01M 8/04089* (2013.01); *G05B 13/0215* (2013.01); *H01M 8/04753* (2013.01); *H01M 8/04992* (2013.01); *H01M 8/00* (2013.01); *H01M 8/04* (2013.01); *Y02E 60/50* (2013.01)

(58) Field of Classification Search
None
See application file for complete search history.

(56) References Cited

U.S. PATENT DOCUMENTS

2003/0110841 A1* 6/2003 Zhang et al. ............. 73/61.76

OTHER PUBLICATIONS

Falta Steven R., Injector Flow Measurement for Fuel Cell Applications, U.S. Appl. No. 12/636,276, filed Dec. 11, 2009.

* cited by examiner

*Primary Examiner* — Miriam Stagg
*Assistant Examiner* — Carmen Lyles-Irving
(74) *Attorney, Agent, or Firm* — John A. Miller; Miller IP Group, PLC

(57) ABSTRACT

A system and method for controlling an injector in a fuel cell system. The method provides a variety of injector pulse widths for at least one predetermined duty cycle and determines an injector close time for each of the variety of injector pulse widths. The method also determines an error for the at least one predetermined duty cycle based on each of the provided injector pulse widths and uses the injector pulse width with the lowest error for the at least one predetermined duty cycle.

20 Claims, 2 Drawing Sheets

ANODE INJECTOR CONTROL ALGORITHM FOR A LOW FREQUENCY DISCRETE OUTPUT

BACKGROUND OF THE INVENTION

1. Field of the Invention

This invention relates generally to a system and method for controlling an injector in a fuel cell system and, more particularly, to a system and method for controlling an injector in a fuel cell system by using a discrete output such that an injector duty cycle may be accurately controlled.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte there between. The anode receives hydrogen gas and the cathode receives oxygen or air. The hydrogen gas is dissociated at the anode catalyst to generate free protons and electrons. The protons pass through the electrolyte to the cathode. The protons react with the oxygen and the electrons at the cathode catalyst to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically, but not always, include finely divided catalytic particles, usually a highly active catalyst such as platinum (Pt) that is typically supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

A fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow fields are provided on the anode side of the bipolar plates that allow the anode reactant gas to flow to the respective MEA. Cathode gas flow fields are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

The membranes within a fuel cell stack need to have sufficient water content so that the ionic resistance across the membrane is low enough to effectively conduct protons. Membrane humidification may come from the stack water by-product or external humidification. The flow of reactants through the flow channels of the stack has a drying effect on the cell membranes, most noticeably at an inlet of the reactant flow. However, the accumulation of water droplets within the flow channels could prevent reactants from flowing therethrough, and may cause the cell to fail because of low reactant gas flow, thus affecting stack stability. The accumulation of water in the reactant gas flow channels, as well as within the gas diffusion layer (GDL), is particularly troublesome at low stack output loads.

In one known type of fuel cell system, the hydrogen gas fuel is injected into the anode side of the fuel cell stack by an injector. The injector is controlled to maintain a desired pressure within the anode subsystem by regulating the injector flow to match the hydrogen being consumed. Typically this is done with a pulse width modulation (PWM) control signal where a duty cycle and a frequency are defined and the firmware of a controller produces a control signal for the desired pulse. However, relying on PWM firmware has certain drawbacks. For example, during up transients it is desirable to inject hydrogen right away without waiting for pressure feedback to avoid hydrogen starvation of the cells. Some PWM firmware requires that the period from the previous command be completed before the next pulse can be generated.

Furthermore, PWM control signals are not able to cut pulses short at times when it is desirable to do so, for example, during down transients in current output of a fuel cell stack. Thus, there is a need in the art for more accurate control of the duty cycle of injectors in the fuel cell system, where the control mechanism is capable of providing a discrete output within a low time resolution.

SUMMARY OF THE INVENTION

In accordance with the teachings of the present invention, a system and method are disclosed for controlling an injector in a fuel cell system. The method provides a variety of injector pulse widths for at least one predetermined duty cycle and determines an injector close time for each of the variety of injector pulse widths. The method also determines an error for the at least one predetermined duty cycle based on each of the provided injector pulse widths and uses the injector pulse width with the lowest error for the at least one predetermined duty cycle.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for controlling an injector in a fuel cell system is merely exemplary in nature, and is in no way intended to limit the invention or its applications or uses.

Figure 1:
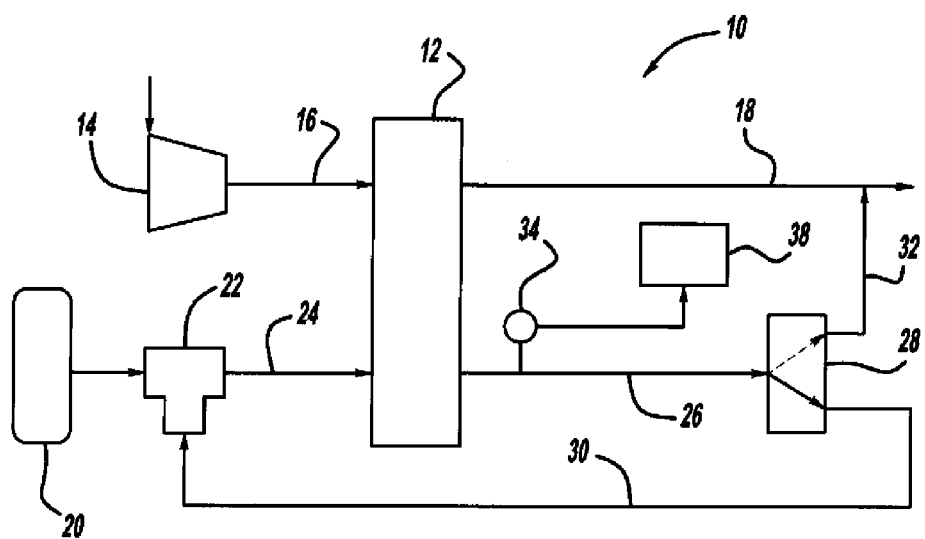
FIG. 1 is a simplified schematic block diagram of a fuel cell system.

FIG. 1 is a simplified schematic block diagram of a fuel cell system 10 including a fuel cell stack 12. The fuel cell system 10 also includes a compressor 14 that provides air on a cathode input line 16 to a cathode side of the fuel cell stack 12, where a cathode exhaust gas is output from the stack 12 on a cathode exhaust gas line 18. The fuel cell system 10 further includes a source 20 of hydrogen gas, typically a high pressure tank, that provides the hydrogen gas to an injector 22 that injects a controlled amount of hydrogen gas on an anode input line 24 to the anode side of the fuel cell stack 12. Although not specifically shown, one skilled in the art would understand that various pressure regulators, control valves, shut-off valves, etc. would be provided to supply the high pressure gas from the source 20 to a pressure suitable for the injector 22. The injector 22 can be any injector suitable for the purposes discussed herein. One suitable example is an injector/ejector, as described in U.S. Pat. No. 7,320,840, entitled "Combination of Injector-Ejector for Fuel Cell Systems," assigned to the assignee of this application and incorporated herein by reference.

An anode effluent gas is output from the anode side of the fuel cell stack 12 on anode output line 26, which is provided to a bleed valve 28. As is well understood by those skilled in the art, nitrogen cross-over from the cathode side of the fuel cell stack 12 dilutes the hydrogen in the anode side of the stack 12, thereby affecting fuel cell stack performance. Therefore, it is necessary to periodically bleed the anode effluent gas from the anode side of the stack 12 to reduce the amount of nitrogen in the stack 12. When the system 10 is operating in a normal non-bleed mode, the valve 28 is in the position where the anode effluent gas is provided to a recirculation line 30 that recirculates the anode gas to the injector 22 to operate it as an ejector and provide recirculated hydrogen back to the anode input of the stack 12. The anode input line 24, the anode side of the stack 12 the anode output line 26 and the anode recirculation line 30 are all components of an "anode subsystem".

When a bleed is commanded to reduce the nitrogen in the anode side of the stack 12, the valve 28 is commanded to direct the anode effluent gas to a by-pass line 32 that combines the anode effluent gas with the cathode exhaust gas on the line 18, where the hydrogen gas is diluted and is suitable for the environment. Alternatively, the valve 28 may direct the anode effluent gas to the by-pass line 32 to combine the anode effluent gas with the cathode inlet gas on the line 16, although this embodiment is not shown for the sake of clarity. A pressure sensor 34 measures the pressure in the anode output line 26, but can be at any location within the anode subsystem to provide an anode side pressure measurement. The system 10 includes a processor 38 that performs and controls the various operations discussed herein, as well as a method for accurately controlling the injector 22 as discussed in more detail below. Although the system 10 is an anode recirculation system, the present invention will have application for other types of fuel cell systems, include anode flow-shifting systems, well understood to those skilled in the art.

In one known fluid injection design for a fuel cell system, the amount of fluid, such as hydrogen, that the system 10 determines is necessary for a particular commanded stack current density is based on the pressure within the anode subsystem. For example, in U.S. patent application Ser. No. 12/636,276 "Injector Flow Measurement for Fuel Cell Applications," assigned to the assignee of this application and incorporated herein by reference, the system monitors the pressure in the anode subsystem, and, for a desired stack load, the system sets the injector on time based on the pressure falling below a predetermined pressure for that load and sets the injector off time based on the pressure rising above the desired pressure for that load. In previous fuel cell systems, the desired injector on and off time is converted to a PWM command signal for the injector having a duty cycle with a particular pulse width and duty cycle. Instead of using a PWM command signal, a discrete output is proposed such that the discrete output drives the injector 22 where the state of the discrete output, i.e., on or off, is determined by controls software in the processor 38, where the controls software is operating at a predefined speed. For example, the controls software may be operating at a predefined speed of 3.125 ms ($\Delta t$). The method for controlling the injector 22 using a discrete output, as discussed in more detail below, is an algorithm that runs continuously such that when the injector 22 needs to be actuated the algorithm will run.

The anode subsystem is modeled within control software of the processor 38 as a continuous flow system. Due to this fact, the quantity of hydrogen that is introduced by each injector pulse is not as important as the average time of the flow of each pulse. In other words, the accuracy of the duty cycle is more important than the duration of the pulse width. However, there is one exception to this rule, namely, the pulse width must always be greater than some predefined minimum pulse width to ensure the stability of the fuel cell system 10.

Another limitation that must be considered when using a discrete output to drive the injector 22 is that there is a maximum frequency that the injector 22 may be used in a predetermined time for durability reasons. For example, the injector 22 may only be used to inject every 0.0625 seconds. Stated another way:

$$t_{on} + t_{off} \geq 10 \cdot \Delta t \quad (1)$$

and $$t_{on} \geq 2 \cdot \Delta t \quad (2)$$

Where $t_{on}$ is the time the injector is injecting hydrogen and $t_{off}$ is the time the injector is not injecting hydrogen.

The duty cycle (DC) of the injector 22, which is the proportion of time the injector 22 is open during one frequency cycle, i.e., the ratio of time the injector 22 is on compared to total time, can be defined as:

$$DC = \frac{t_{on}}{t_{on} + t_{off}} \quad (3)$$

Rearranging equation (3) gives:

$$t_{off} = \frac{t_{on}}{DC} - t_{on} \quad (4)$$

Substituting $t_{off}$ back into equation (1) gives:

$$t_{on} \geq \max(20 \cdot \Delta t \cdot DC \text{ or } 2 \cdot \Delta t) \quad (5)$$

Figure 2:
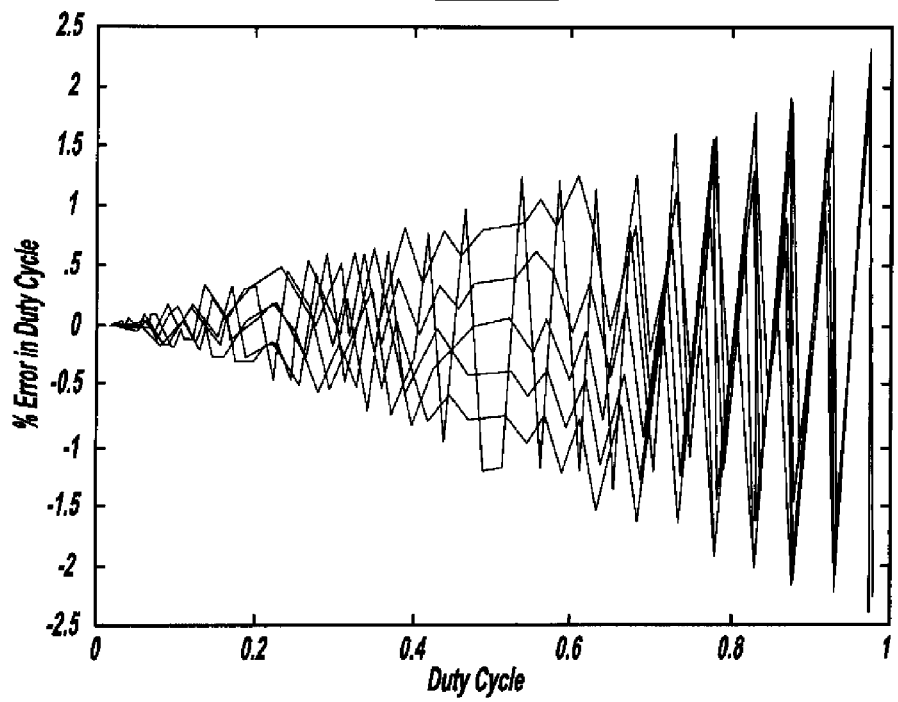
FIG. 2 is a graph with duty cycle on the horizontal axis and percent error in the duty cycle on the vertical axis.

Both $t_{on}$ and $t_{off}$ must be rounded to the nearest 3.125 milliseconds for equation (5) to work, and rounding will cause errors in the resulting duty cycle. The error over the range of the duty cycles is shown by the graph in FIG. 2, where duty cycle is on the horizontal axis and percent error in the duty cycle is on the vertical axis. The results shown in FIG. 2 are obtained by setting $t_{on}$ equal to the right side of equation (5), however, $t_{on}$ can increase and $t_{off}$ may be solved for and still satisfy equations (1)-(5). In effect, $t_{on}$ (pulse width) and $t_{off}$ (inversely proportional to frequency) are varied to achieve the most accurate duty cycle. These variations are represented in the following equation:

$$\begin{bmatrix} t_{on}^1 \\ t_{on}^2 \\ t_{on}^3 \end{bmatrix} = t_{on} + \begin{bmatrix} 0 \\ 0.003125 \\ 0.00625 \end{bmatrix} \quad (6)$$

Figure 3:
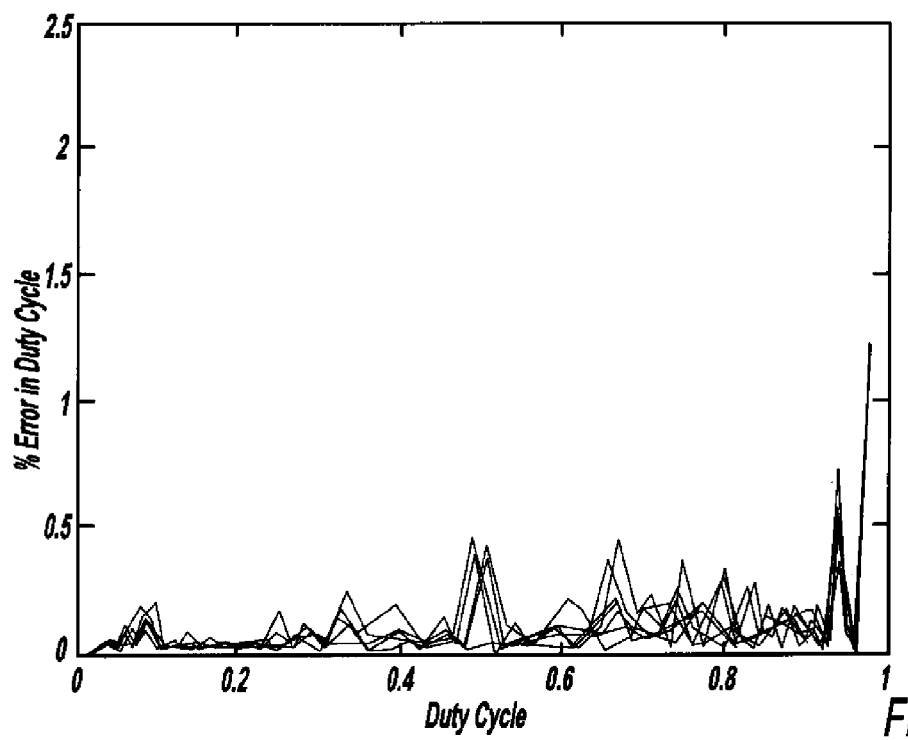
FIG. 3 is a graph with duty cycle on the horizontal axis and percent error in the duty cycle on the vertical axis.

For example, 0Δt is 0 seconds, 1Δt is 0.003125 seconds and 2Δt is 0.00625 seconds. Multiple $t_{on}$'s for various times greater than the example values may be used. The more values for $t_{on}$ that are used equates to a more accurate duty cycle, as is described in more detail below. $T_{off}$ is determined for each of the corresponding $t_{on}$'s, and once $t_{on}$ and $t_{off}$ are determined and rounded appropriately the duty cycle can be calculated using equation (3). Error (E) can then be determined by:

$$E = \left| DC_{req} - \frac{t_{on}}{t_{on} + t_{off}} \right| \quad (7)$$

Where $DC_{req}$ is the duty cycle request, as determined by the processor 38. The duty cycle requested is an input to the algorithm discussed herein. Using equation (7), the value $t_{on}$ and $t_{off}$ with the lowest absolute error is chosen. The resulting duty cycle error is shown by the graph in FIG. 3, where duty cycle is on the horizontal axis and percent error in the duty cycle is on the vertical axis. As shown in FIG. 3, the percent error in the duty cycle is less than one percent over the whole range of duty cycles once the lowest absolute error is chosen using equation (7). However, one down side to this approach is that it increases the frequency range for a given duty cycle.

Figure 4:
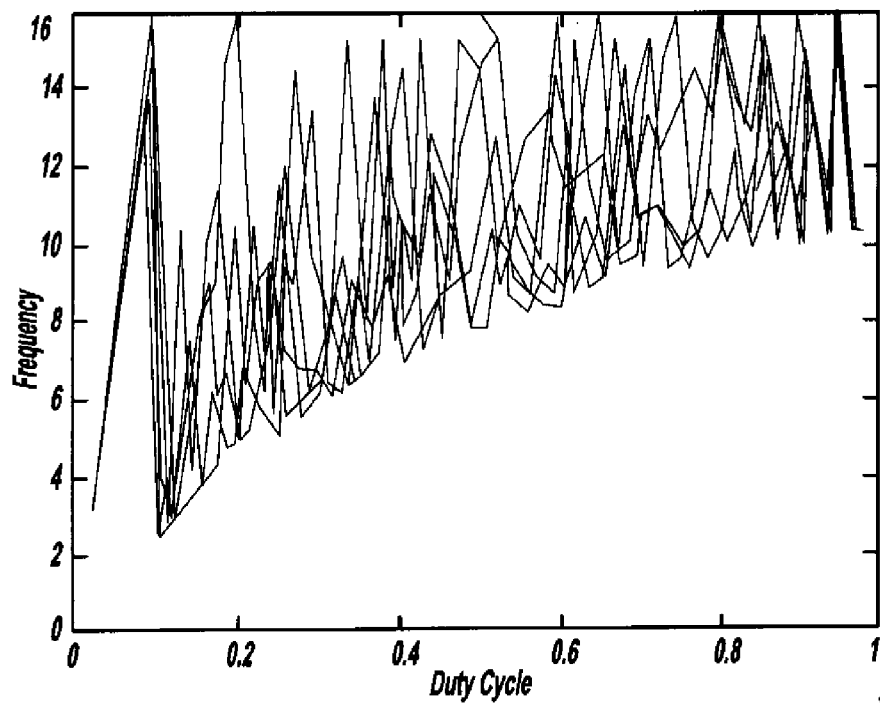
FIG. 4 is a graph with duty cycle on the horizontal axis and frequency on the vertical axis.

FIG. 4 is a graph with duty cycle on the horizontal axis and frequency on the vertical axis, which illustrates that by using the approach discussed above a large frequency band is needed, i.e., the frequency range that the injector is allowed to run is greater, to obtain higher duty cycle accuracy. This increase in frequency change could have a negative effect on noise, vibration and harshness. To minimize this negative effect, a term for control effort may be added to equation (7) to minimize frequency oscillations. For example, the duty cycles that are calculated may be within a predetermined frequency range using:

$$E = A \cdot \left| DC_{req} - \frac{t_{on}}{t_{on} - t_{off}} \right| + B \cdot \Delta f \quad (8)$$

Where A is accuracy, B is control effort and Δf is the change in frequency between the last value and the current value of $$\frac{1}{t_{on} + t_{off}}.$$

Both A and b can be calibrated to make the needed tradeoffs between accuracy and control effort.

The approach of controlling the injector 22 as described above provides the benefit of allowing the control signal to the injector 22 to be interrupted at any time. Thus, the selected duty cycle may be cut short when predetermined conditions are met. One example of this would be to cut the duty cycle short when a down transient in power output of the stack 12 is detected.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for controlling an injector in a fuel cell system, said method comprising:
setting an injector pulse width for at least one predetermined duty cycle;
determining an injector close time for the at least one predetermined duty cycle based on the injector pulse width;
changing the injector pulse width for the at least one predetermined duty cycle;
determining an injector close time for the at least one predetermined duty cycle based on the changed injector pulse width;
repeating the step of changing the injector pulse width for the at least one predetermined duty cycle such that a variety of injector pulse widths are used for the at least one predetermined duty cycle;
repeating the step of determining injector close time for the at least one predetermined duty cycle each time the injector pulse width is varied such that injector close time is determined for each of the variety of injector pulse widths for the at least one predetermined duty cycle;
determining an error for the at least one predetermined duty cycle for each of the injector pulse widths used; and
using the injector pulse width with the lowest error for the at least one predetermined duty cycle.

2. The method according to claim 1 wherein the at least one predetermined duty cycle is several different duty cycles.

3. The method according to claim 1 wherein controlling the injector using the at least one duty cycle includes directly controlling the injector with a discrete output.

4. The method according to claim 3 wherein the discrete output is a Boolean output.

5. The method according to claim 3 wherein directly controlling the injector includes cutting at least one period of a duty cycle short when predetermined conditions are met.

6. The method according to claim 5 wherein the predetermined conditions include a down transient in power output of a fuel cell stack in the fuel cell system.

7. A method for controlling an injector in a fuel cell system, said method comprising:
providing a variety of injector pulse widths for at least one predetermined duty cycle;
determining an injector close time for each of the variety of injector pulse widths;
determining an error for the at least one predetermined duty cycle based on each of the provided injector pulse widths; and
using the injector pulse width with the lowest error for the at least one predetermined duty cycle.

8. The method according to claim 7 wherein controlling the injector using the at least one predetermined duty cycle includes directly controlling the injector with a discrete output.

9. The method according to claim 8 wherein the discrete output is a Boolean output.

10. The method according to claim 8 wherein directly controlling the injector includes cutting the at least one predetermined duty cycle short when predetermined conditions are met.

11. The method according to claim 10 wherein the predetermined conditions include a down transient in power output of a fuel cell stack in the fuel cell system.

12. The method according to claim 8 wherein directly controlling the injector includes injecting hydrogen without waiting for pressure feedback from a pressure sensor.

13. The method according to claim 7 wherein each pulse width is at least $2\Delta t$ in duration.

14. An injection system for injecting a fluid into a fuel cell system, said injection system comprising:
   a processor that provides:
   means for providing a variety of injector pulse widths for at least one predetermined duty cycle;
   means for determining an injector close time for each of the variety of injector pulse widths;
   means for determining an error for each of the at least one predetermined duty cycles based on each of the provided injector pulse widths; and
   means for using the injector pulse width with the lowest error for the at least one predetermined duty cycle.

15. The injection system according to claim 14 wherein the at least one predetermined duty cycle is several different duty cycles.

16. The injection system according to claim 14 further comprising means for directly controlling the injector with a discrete output.

17. The injection system according to claim 16 wherein the discrete output is a Boolean output.

18. The injection system according to claim 14 further comprising means for cutting at least one predetermined period of a duty cycle short when predetermined conditions are met.

19. The injection system according to claim 18 wherein the predetermined conditions include a down transient in power output of a fuel cell stack of a fuel cell system.

20. The injection system according to claim 14 wherein the injector pulse widths are at least $2\Delta t$ in duration.

* * * * *